July 11, 1933.  A. APEL  1,917,352
WINDROWING MACHINE
Original Filed Feb. 1, 1928   2 Sheets-Sheet 1

INVENTOR.
Albert Apel
BY
Erwin, Wheeler & Woolard
ATTORNEYS.

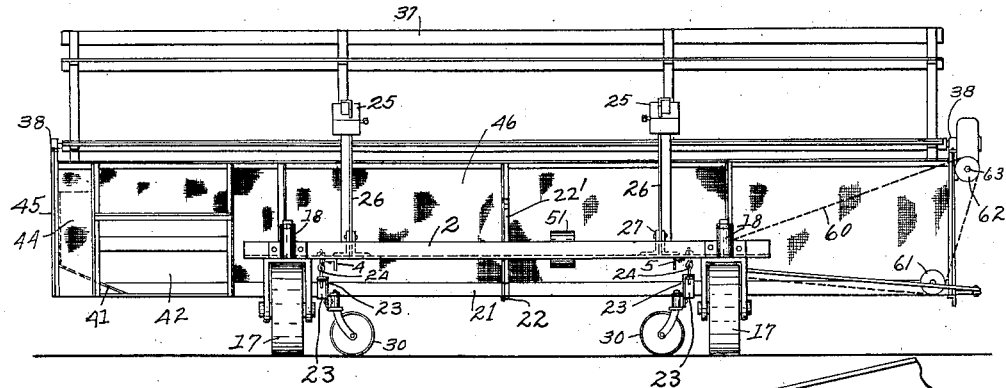
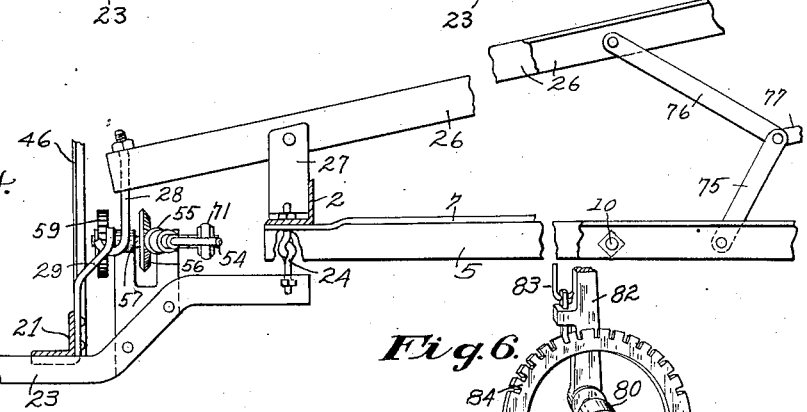
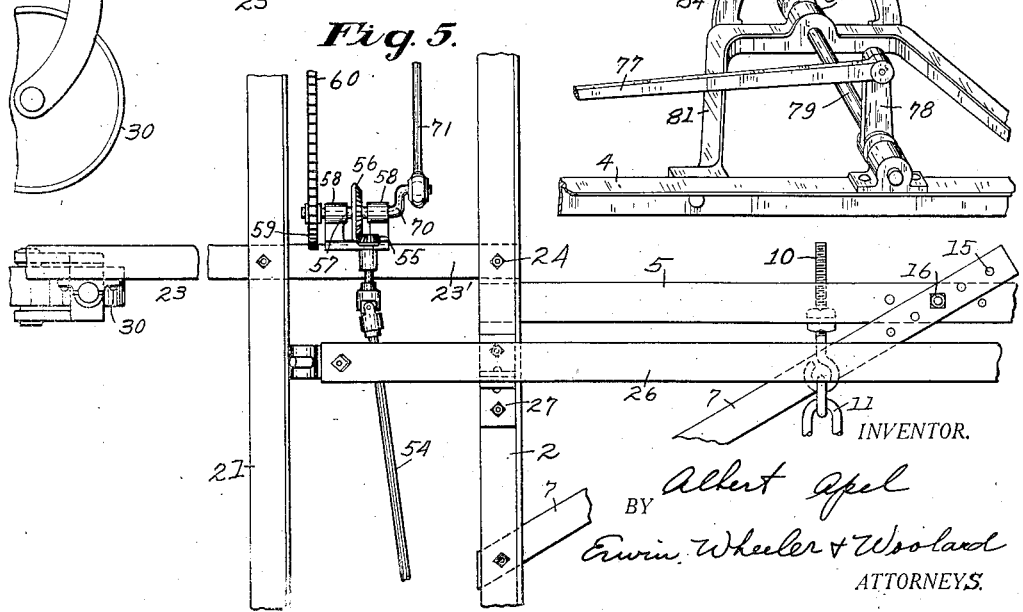

Patented July 11, 1933

1,917,352

UNITED STATES PATENT OFFICE

ALBERT APEL, OF MOLINE, ILLINOIS, ASSIGNOR TO DEERE & COMPANY, OF MOLINE, ILLINOIS, A CORPORATION OF ILLINOIS

WINDROWING MACHINE

Application filed February 1, 1928, Serial No. 251,002. Renewed December 12, 1932.

One of the principal objects of this invention is to provide a windrowing machine which will place the first windrow around a field at a distance from the surrounding fence, or at a distance from other material which is not to be cut.

It is an object of this invention to provide a windrowing machine which may be pushed and operated by a tractor, which will cut a wide swath within which the tractor and windrowing machine may travel, which will collect and deposit cut grain in a comparatively narrow line of deposit at one side of the swath and to the rear of the machine as the grain is being cut, and which will also place the deposited grain upon the stubble of the cut grain and away from the uncut grain defining one margin of the swath.

Other objects are to provide a windrowing machine frame which may be varied in size for attachment to any tractor, which will support the windrowing mechanism in pivotally balanced relation from the tractor, and to provide manually operable means for tilting the windrowing mechanism about its pivot and for holding such mechanism in the desired tilted position.

A still further object is to provide a windrowing machine which may be transported upon the public highways and which will not occupy any more of the road width than is required by vehicles usually found upon such highways.

In the accompanying drawings:

Figure 3 is a rear view in elevation of the windrowing machine.

Figure 1:
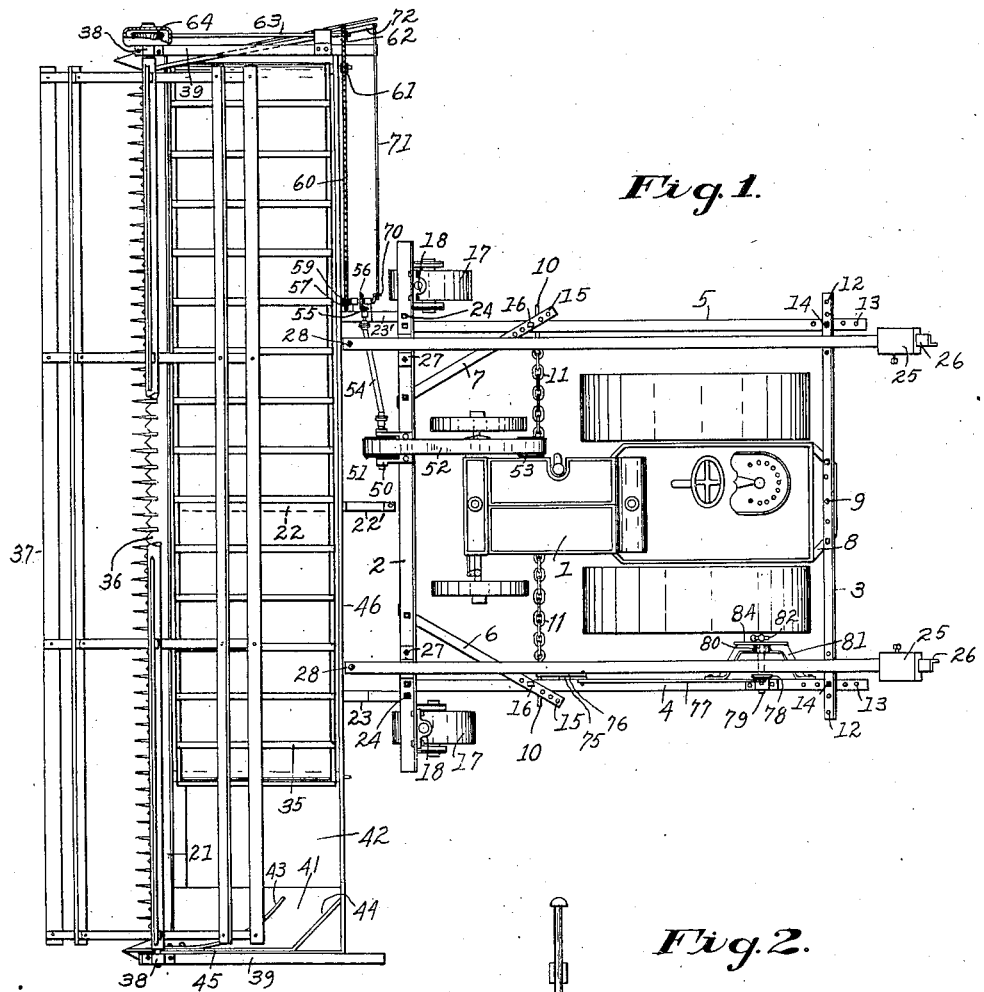
Figure 1 is a plan view of a windrowing machine embodying this invention.

Figures 4 to 6, inclusive, are enlarged detail views of portions of the machine.

Like parts are identified by similar reference numerals throughout the several views.

The frame for connecting the windrowing mechanism (hereinafter described) to a tractor 1 includes a generally rectangular portion comprising a transverse front bar or angle-iron 2, a transverse rear bar or angle-iron 3, longitudinally extending side bars or angle-irons 4 and 5, and brace bars 6 and 7. The rear bar 3 rests upon and is detachably secured to the tractor bracket 8 by a bolt 9 or other suitable means. The side bars 4 and 5 are respectively detachably secured to the frame of the tractor 1 by eye-bolts 10 and chains 11, the eye-bolts being provided with clamping nuts to facilitate securing them to the frame bars 5 in the proper positions of adjustment. The rectangular frame portion just described may be adjusted to fit differing sizes of tractors and this adjustment may be accomplished by providing in each end of the rear bar 3 a series of holes 12 and in the rear end of each side bar 4 and 5 a series of holes 13 which may be aligned with an appropriate hole 12 to receive a securing bolt 14. Necessarily when the rear and side bars are adjusted, the brace bars 6 and 7 must be adjusted to compensate for the different settings of the side and rear bars and consequently the brace bars are each provided with a series of holes 15 through which a bolt 16 may be passed for securing the brace bars in adjusted position relative to their respective side bars. As will be noted, the forward end of the described frame portion is mounted on caster wheels 17 which are swively carried in brackets 18 secured adjacent the ends of transverse bar 2.

Figure 2:
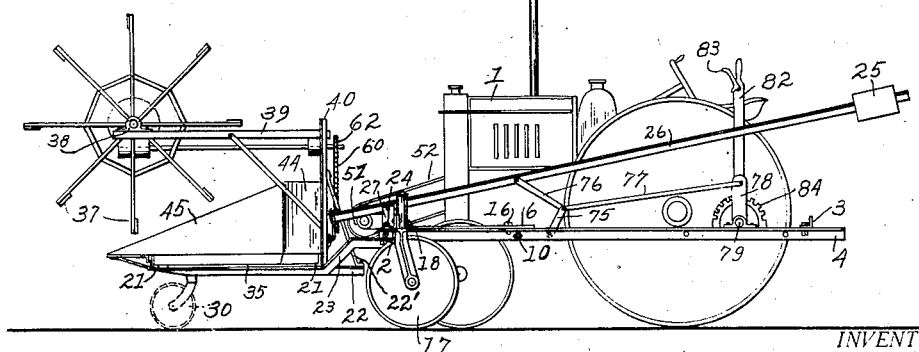
Figure 2 is a view in side elevation of the machine shown in Figure 1.

The windrowing mechanism (hereinafter described) is supported by a front frame portion including transverse bars or angle-irons 21 connected by longitudinal bars or angle-irons 22 and 23. Bars 23 are extended rearwardly and upwardly and are supported from the bar 2 by eye bolts 24. The windrowing mechanism is balanced on the eye bolts by means of the counter-balancing weights 25 which are movably secured to the balance arms or beams 26. The balance arms are pivotally mounted on brackets 27 secured to the front bar 2 of the frame and are linked with the frame supporting the windrowing mechanism by the hook bolts 28 engaging the hanger brackets 29 secured to the rear transverse bar 21. The forward ends of bars 23 are provided with casters 30 which may be detached therefrom when the machine is in use. In Figure 2 the casters 30 are shown in broken lines, indicating their position when attached to the frame.

Mounted upon the front frame portion is a conveyor 35 disposed transversely of the machine. Immediately in front of the conveyor is a sickle 36 of usual construction. Above the sickle is disposed a reel 37 rotatably mounted in bearings 38 on the arms 39 carried by the uprights 40 on the front frame portion of the machine. It will be noticed that the sickle and reel are longer than the conveyor and that at the end of the sickle and reel, a deflector is provided which is spaced from the conveyor 35 to provide an opening 42 for depositing cut grain in a windrow upon the stubble of the cut grain. The deflector includes an inwardly extending shelf-like portion 41, a deflector finger 43 and rear vertical portion 44 extending at an angle from the divider shoe or plate 45 inwardly toward the opening 42. Screening 46 is provided at the rear of the conveyor to prevent cut grain from falling to the rear of the machine until it has been conveyed to the opening 42.

Mounted on bearings 50 secured to the transverse bar 2, is a pulley 51 which is connected by a belt 52 to the pulley 53 driven by the tractor engine. Universally connected with the pulley 51 is a torque shaft 54 which is also universally connected with bevel pinion 55 rotatably carried by the bar 23′. Meshing with the pinion 55 is a bevel gear 56 which is secured to shaft 57 projecting from the bearings 58. One of the projecing ends of shaft 57 carries a sprocket wheel 59 which is connected by chain 60 with the sprocket wheels 61 and 62 (see Figure 3). Sprocket wheel 61 is connected with the conveyor 35 for operation thereof. Sprocket wheel 62 is secured to shaft 63 which is provided with a worm operatively driving worm wheel 64 connected with the reel 37. Thus the reel will be rotated from the tractor engine through the pulley 53, belt 52, pulley 51, shaft 54, bevel pinion 55, bevel gear 56, shaft 57, sprocket wheel 59, chain 60, sprocket 62, shaft 63, and worm wheel 64.

The shaft 57 is provided with a crank 70 operatively connected with crank rod or pitman 71. Pitman 71 is connected with the walking beam or oscillator rod 72 which is pivoted to the sickle blades 36. Thus the sickle is oscillated from the engine tractor through pulley 53, belt 52, pulley 51, shaft 54, bevel pinion 55, bevel gear 56, shaft 57, crank 70, rod 71 and beam 72.

The conveyor 35 is operated from the tractor engine through pulley 53, belt 52, pulley 51, shaft 54, bevel pinion 55, bevel gear 56, shaft 57, sprocket 59, chain 60, and sprocket 61.

When grain is being cut the reel 37 will cause the grain to fall rearwardly as the sickle is cutting it. The grain which falls upon the conveyor 35, will be conveyed thereby to the opening 42 where it will be deposited with the grain which falls directly back from the sickle into the opening. Grain which is cut in front of the deflector 41 will fall thereon and be directed by the finger 43 and portion 44 to the opening 42. The end plate 45 prevents this grain from falling laterally of the machine and upon the standing grain. It will also be apparent that the action of the deflector 41 is to place the cut grain a desirable distance from the standing grain, the deflector plate 41 is disposed at or near the level of the sickle and of the top of the conveyor and in a position to cover the stubble in the rear of the associated end portion of the sickle. The butt ends of the cut grain straw drop to this plate and the heads tend to be supported by the finger 43 and the obliquely positioned wing 44, but as the material accumulates, it tends to slide toward the open space 42 into which it drops without having first become entangled with the stubble thus leaving a clear stubble path of substantially the width of the plate 41 between the windrow and the line along which the divider plate travels. I find that such a deflector is much more effective than the track clearing wings heretofore employed in an attempt to push the fallen material away from the standing grain after it has fallen upon the stubble for it then becomes entangled therewith and partially retained.

The balance arm 26 is connected by toggle links 75 and 76 to the side bar 4 and the links are connected with rod 77 which in turn is pivotally secured to the arm 78. Arm 78 is secured to shaft 79 journaled on the side bar 4. Shaft 79 extends to bearing 80 on bracket 81 carried by side bar 4. Secured to the shaft is a lever 82 which is provided with means 83 for releasably engaging the segment 84. To raise or lower the position of the windrowing mechanism, the lever 82 will be manually released from segment 84 and appropriate movement thereof will, through shaft 79, lever arm 78, rod 77, and link 75 and 76, raise or lower the balance arm 26. When the desired adjustment in vertical position of the windrowing mechanism is obtained, the lever 82 will through its engagement with the segment 84 maintain the mechanism in such desired position.

When the tractor is attached to the windrowing machine in the manner indicated, it will in effect pull the windrowing machine from the rear of the tractor, although the tractor is disposed at the rear of the machine. The windrowing machine will be guided from the tractor by means of the chains 11. The chains being the only connections between the front of the tractor and the windrowing machine frame, permit the windrowing machine to freely follow ground irregularities without in any way producing extraordinary strains upon the connections between the machine frame and tractor. These chains are adjustably connected with the frame bars 4 and 5 respectively by suitable eye-bolts 10, as best shown in Figure 5.

After the machine frame has been attached to the tractor in the manner indicated, the caster wheels 30 will be removed and the windrowing mechanism then adjusted to its proper height by means of the lever 82. In its adjusted position, the weight thereof will be counter-balanced by the weights 25 and consequently the adjusting mechanism including the links 75 and 76 will not have imposed on them any very great strain while maintaining the windrowing mechanism in adjusted position.

It will also be observed that the specific manner in which the tractor is attached to the windrowing machine frame, places the tractor substantially centrally at the rear of the windrowing mechanism, thus disposing the tractor in the swath of the machine at one side of the windrow and in a position where it will not crush down the standing grain.

The mechanism for driving the windrowing mechanism from the tractor engine is very simple and can very easily and quickly be connected with the tractor engine. The grain cut by the sickle will all be laid in a row defined by the opening 42 between the conveyor 35 and deflector 41. This row will be disposed at one side of the path traveled by the tractor and a short distance from the standing grain. Thus the device may be driven about a field and the first cut will be placed in a row sufficiently far from a fence to permit it to be picked up directly without subsequent handling.

Another function which the machine may perform is in finishing up a field. The last cut is usually rather narrow and the grain cut may be placed adjacent a previously laid row of cut grain, thus permitting two rows of grain to be gathered subsequently. Where the grain crop is light, the rows of cut grain which are laid down by the windrowing machine will also be light. Consequently, in order to give the pick-up machine, which is subsequently used to gather grain, its full load, the rows of grain may be laid in double rows throughout the field. This is accomplished by moving the windrowing machine successively in opposite directions about a field.

When using a windrowing machine of this invention, the grain at the corners of a field may be cut in at least two different ways, namely: The machine may be driven directly into the corners, then withdrawn a sufficient distance to permit it to be moved into the standing grain at the side of the swath in a curvilinear course at the corners; or the machine may be first driven in a curvilinear course about the corners and then subsequently driven directly into the corners to cut the standing grain.

Where the cut grain is laid in a curvilinear path about the corners of a field, the subsequent gathering of the grain is facilitated, since the pick-up machine which performs the gathering operation can take this curvilinear path and at the same time gather grain.

I claim:

1. In a windrowing machine, a sickle, a deflector in the rear of one end portion of the sickle extending inwardly from its extremity and adapted to prevent the cut material from falling upon the ground over which that portion of the sickle passes, and a conveyor extending from the other end of said sickle to a point spaced from the deflector, whereby grain cut by the sickle will be deposited in a row defined by the space between the deflector and conveyor.

2. In a windrowing machine, a sickle, an inwardly extending deflector disposed at the rear side of one end portion of the sickle in a position to receive the falling material and direct it inwardly of the path of travel thereof, and a conveyor extending from the other end of said sickle to a point spaced from the deflector, whereby grain cut by the sickle will be deposited in a row defined by the space between the deflector and conveyor without permitting it to first engage those portions of the stubble over which the deflector and conveyor travel.

3. In a windrowing machine, a sickle, a reel of substantially corresponding length disposed above the sickle, a deflector at the rear side of one end portion of the sickle in a position to prevent the material cut by that portion from falling upon the stubble over which it passes, said deflector being formed to direct the material falling thereon toward the central portion of the space over which the sickle travels and a conveyor extending from the other end of said sickle to a point spaced from the deflector, and means for operating the sickle, reel, and conveyor.

4. In a windrowing machine, a frame for receiving a tractor and provided at one end with means for securing it to a tractor and at the other end with caster wheels for supporting it from the ground, a second frame for supporting windrowing mechanism and pivotally carried by the first mentioned frame, and means for releasably securing said frames against relative pivotal movement.

5. In a windrowing machine, a frame for receiving a tractor and provided at one end with means for securing it to a tractor and at the other end with caster wheels for supporting it from the ground, means for flexibly securing the last mentioned end to said tractor, whereby said machine may be directed by said tractor, a second frame for supporting windrowing mechanism and pivotally carried by the first mentioned frame, and means for releasably securing said frames against relative pivotal movement.

6. In a windrowing machine a frame for receiving a tractor and provided with means for securing it to a tractor and at the other end with caster wheels for supporting it from the ground, means for flexibly securing the last mentioned end to said tractor for relative vertical movements, a second frame for supporting windrowing mechanism and pivotally carried by the first mentioned frame, a balancing arm pivotally supported by the first mentioned frame, a link pivotally connecting said arm and windrow mechanism supporting frame, and means for releasably and adjustably securing the arm relative to the first mentioned frame.

7. In a windrowing machine, a frame for receiving a tractor and provided at one end with means for securing it to a tractor and at the other end with caster wheels for supporting it from the ground, a second frame for supporting windrowing mechanism and pivotally carried by the castered end of the first mentioned frame, means for releasably securing said frames against relative pivotal movement, and casters detachably secured to the windrow mechanism supporting frame.

8. The combination with a tractor having a pulley disposed at one side thereof; of a windrowing machine comprising a frame extending about said tractor, a second frame pivotally supported in front of said tractor from the first mentioned frame, a pulley on the second frame carried adjacent the axis of said pivot and connected with the tractor pulley, windrowing mechanism carried by the second frame, and means connecting the second mentioned pulley and windrowing mechanism; and means balancing the second frame on its pivot.

9. A windrowing machine provided with a balancing bar having a pair of supporting ground wheels, a sickle of greater length than the distance between said ground wheels and counterpoised upon the balancing bar, means for receiving and supporting the material cut by the end portions of the sickle and delivering it inwardly from such end portions of points at one side of the ground wheels, and actuating connections for the push bar and sickle.

10. In a windrowing machine, the combination with a sickle, of a sickle supporting bar provided with ground wheels spaced rearwardly from the sickle intermediate of its end portions, and means operative immediately in the rear of the end portions of the sickle for preventing the cut material from falling upon the stubble over which such end portions pass and directing it to the ground at one side of the bar supporting wheels.

11. In a windrowing machine, the combination of a wheeled support, a cutter carried thereby, and means between the support and the cutter for preventing material from falling to the stubble back of the respective end portions of the cutter, said means including devices for directing the material laterally and depositing it at one side of the support and at a substantial distance from the ends of the cutter.

12. In a harvesting machine, a frame for receiving a tractor, provided at one end with means for securing it to the tractor, and at the other end with caster wheels for supporting it from the ground and positioned to be substantially in transverse alinement with the front wheels of the tractor, a second frame for supporting harvesting mechanism and pivotally carried by the first mentioned frame, and means for releasably securing said frames against relative pivotal movement.

13. The combination with a tractor having rear propelling wheels and front steering wheels, of a harvesting machine comprising a framework within which the tractor is located, the rear portion thereof being connected to the tractor, and the front portion thereof being supported on laterally spaced wheels, means for causing said frame to move with the tractor in the lateral steering movements of the latter, and harvesting mechanism pivotally supported from said frame for movement in a vertical plane.

14. A harvester comprising front, rear, and side members forming a rectangular frame adapted to encircle a tractor, said rear member and said side members having adjustable connections by which the distance between said side members and the distance between the front and rear members may be varied to accommodate different sized tractors, means for pivotally connecting the rear member to a tractor located within said frame, spaced wheels for carrying the front portion of said frame, and harvesting mechanism carried by and extending across the front of said frame.

15. A harvester comprising front, rear, and side members forming a rectangular frame adapted to encircle a tractor, said rear member and said side members being relatively adjustable to vary the distance between said side members and the distance between the front and rear members in accordance with the requirements of different tractors, diagonal braces connected at one end to said front member and adjustably connected at the other end to said side members, means for pivotally connecting the rear member to the rear of a tractor, spaced wheels for carrying the front portion of said frame, and harvesting mechanism carried by and extending across the front of said frame.

16. The combination of a harvesting machine comprising a rectangular frame adapted to receive propelling means and provided at one end with means for securing it to the propelling means and at the other end with wheels for supporting it from the ground, a second frame for supporting a harvesting mechanism and pivotally carried by the first mentioned frame, balancing beams independently connected to said second frame and extending along opposite sides of the first mentioned frame, said beams being pivotally mounted on said rectangular frame, and means for releasably securing said frames against relative pivotal movement.

17. In a windrowing machine, a sickle, a deflector disposed at one end of the sickle and formed to direct cut material inwardly, said deflector being adapted to support the material above the stubble while directing it inwardly and a conveyor extending from the other end of the sickle to a point spaced from the deflector, whereby grain cut by the sickle will be deposited in a row defined by the space between the deflector and conveyor.

18. In a windrowing machine, a sickle, a device disposed in the rear of one end portion of the sickle for supporting cut material out of contact with the stubble from which the material is cut, and directing it toward the space in the rear of the central portion of the sickle, a conveyor extending along the rear side of the sickle from the other end thereof to a point spaced from said device, whereby all of the material cut by the sickle may be deposited in a windrow intermediate of the stubble over which the end portions of the sickle travel, and actuating connections operative in the rear of the conveyor.

19. A harvester comprising the combination with driving and propelling mechanism, of a wheeled support loosely connected with and guided by the propelling mechanism, a sickle carried by said support and operatively connected with the driving and propelling mechanism and means intermediate of the sickle and its support for preventing cut material from dropping to the stubble in the rear of either the end portions of the sickle or those portions thereof in front of the propelling mechanism.

20. In a windrowing machine, a sickle, a deflector disposed rearwardly of and at one end of the sickle, a conveyor extending from the other end of said sickle to a point spaced from the deflector, said deflector including a grain receiving plate and an end plate extending rearwardly from said one end of the sickle with one of its flat surfaces facing the delivery end of the conveyor, and having its rear portion bent rearwardly and inwardly, whereby material cut by the sickle will be deposited in a row defined by the space between the deflector and conveyor.

21. In a windrowing machine, a sickle, a deflector finger positioned at one end of the sickle and extending rearwardly and inwardly, means associated with the deflector finger for preventing material cut by the sickle in front of the deflector finger from reaching the stubble over which said finger passes, and a conveyor extending from the other end of the sickle to a point spaced from the deflector finger, whereby grain cut by the sickle will be deposited in a row defined by the space between the finger and conveyor.

22. In a windrowing machine, the combination with a sickle, of gathering means adapted to receive, support and direct material cut by one end of the sickle toward the center line of the swath and a conveyor extending from the other end of the sickle across said center line with its delivery end in windrow forming relation to the gathering means, whereby the width of the windrow may be reduced to less than the distance between the delivery end of the conveyor and the associated end of the sickle, and whereby the windrow may be formed between sickle actuating means and a margin of the remaining field of uncut material.

23. In a windrowing machine, a sickle, a conveyor positioned back of the sickle and extending from one end of the sickle to a point spaced from the other end of the sickle, supporting means positioned back of said other end of the sickle and extending rearwardly and inwardly thereof, the space between its inner edge and the end of the conveyor defining a delivery opening, said means being arranged to receive material cut by that portion of the sickle back of which said means is positioned and such other material as may be conveyed by the conveyor across the delivery opening, and deliver it into the delivery opening, meanwhile supporting it above the stubble left by that portion of the sickle back of which said means is positioned.

24. In a windrowing machine, a harvesting platform comprising a sickle, a conveyor positioned back of the sickle and extending from one end of the sickle to a point spaced from the other end of the sickle, material supporting means extending rearwardly from said other end of the sickle to receive material cut thereby, said means being inclined downwardly to a point at least as low as the lowermost horizontal plane of the platform, and means extending rearwardly and inwardly from said other end of said sickle to direct material cut by said other end of the sickle inwardly toward the conveyor.

ALBERT APEL.